US 6,571,216 B1

United States Patent
Garg et al.

(10) Patent No.: US 6,571,216 B1
(45) Date of Patent: May 27, 2003

(54) DIFFERENTIAL REWARDS WITH DYNAMIC USER PROFILING

(75) Inventors: Rahul Garg, Ghaziabad (IN); Parul Alok Mittal, New Delhi (IN); Natwar Modani, Jaipur (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,603

(22) Filed: Jan. 14, 2000

(51) Int. Cl.[7] ............................................... G06F 17/60
(52) U.S. Cl. .......................................................... 705/14
(58) Field of Search ........................................... 705/14

(56) References Cited

U.S. PATENT DOCUMENTS

| | | | |
|---|---|---|---|
| 5,185,695 A | | 2/1993 | Pruchnicki |
| 5,774,870 A | * | 6/1998 | Storey .......................... 705/14 |
| 5,857,175 A | | 1/1999 | Day et al. |
| 5,924,080 A | | 7/1999 | Johnson |
| 5,948,061 A | * | 9/1999 | Merriman et al. ........... 709/219 |
| 5,963,951 A | * | 10/1999 | Collins ......................... 707/102 |
| 5,970,469 A | * | 10/1999 | Scroggie et al. .............. 705/14 |

FOREIGN PATENT DOCUMENTS

WO WO 99/46708 * 9/1999

OTHER PUBLICATIONS

Levey, Richard H., "Isuzu taps database, gets big results", Direct, vol. 11 No. 2, Feb. 1999, p. 111(1).*

* cited by examiner

*Primary Examiner*—Eric W. Stamber
*Assistant Examiner*—Donald L. Champagne
(74) *Attorney, Agent, or Firm*—Whitham, Curtis & Christofferson, P.C.; T. Rao Coca

(57) ABSTRACT

A methodology and system allows a plurality of reward scheme owners to give differential rewards, through a plurality of reward distribution agents, to various users based on the user profile. The reward scheme owner may be a seller, a manufacturer, a sales promotion agent or even an intermediary. Similarly, the reward distribution agent may be an on-line or a physical retailer, a broker, a seller or an intermediary. Also the users may be consumers, businesses, brokers or other intermediaries. In one specific case, a reward scheme owner defines a plurality of reward schemes, including at least one differential reward scheme giving different rewards to different users. The reward scheme owner communicates these to a central reward scheme database server. The reward scheme owners may or may not advertise these schemes. The user visits an online or a physical store. The store acting as a reward distribution agent dynamically profiles the user, queries the central reward scheme database server if the user profile meets the criterion for one or more rewards and offers the applicable rewards to the user. The store later receives reimbursement for the rewards offered to various users, from the reward scheme owners. This methodology and system may be used for offering targeted or differential discounts on different products and services, offering different promotional schemes on different combination of products, giving loyalty points, electronically distributing prizes, free samples, product warranties, tie-in promotions, cross selling, up selling, premiums, memberships, card discounts, organizing contests, sweepstakes, games and offering other similar rewards.

6 Claims, 5 Drawing Sheets

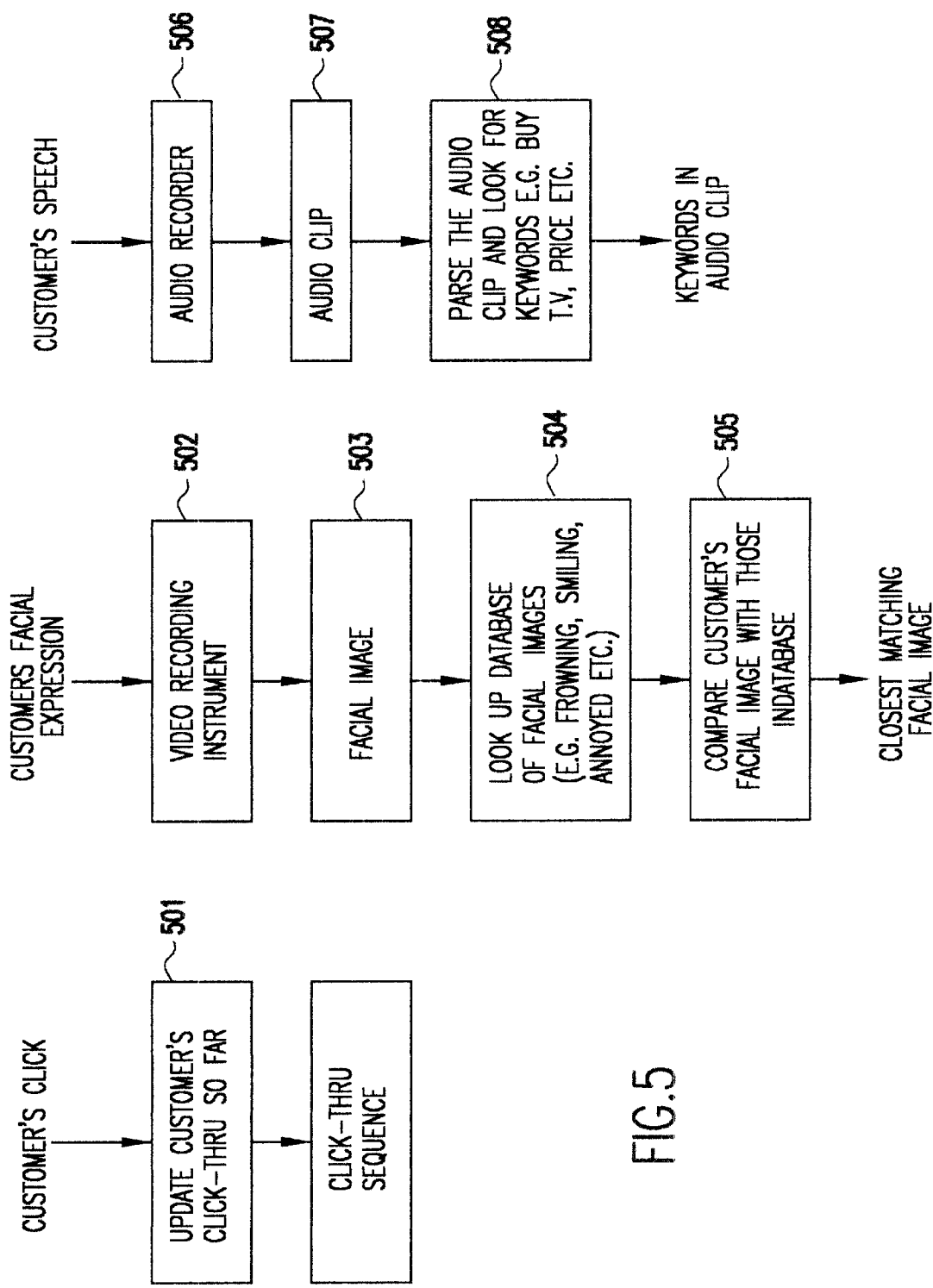

DIFFERENTIAL REWARDS WITH DYNAMIC USER PROFILING

CROSS REFERENCE TO RELATED APPLICATION

The subject matter of this application is relate to that of application Ser. No. 09/407,434 filed Sep. 29, 1999, by Alok Aggarwal and Parul Alok Mittal for "On-Line Negotiations with Dynamic Profiling" and assigned to a common assignee herewith. The disclosure of application Ser. No. 09/407,434 is incorporated herein by reference.

BACKGROUND OF THE INVENTION

1. Field of the Invention

The present invention generally relates to on-line sales promotions and, more particularly, to an on-line system for differential rewards with user profiling.

2. Background Description

Various forms of reward schemes are currently being used in practice; e.g., buy one get one free, coupons offering discounts on various products and services, mail-in rebates, price markdowns, buy suit get tie free, etc. However most of the reward schemes are untargeted; i.e., same markdown is available to everyone.

Using coupons it is possible to give targeted rewards, but the processing of coupons is time consuming and expensive, comprising of the coupon distribution costs incurred by the manufacturer, his or her agent or the retailer, the coupon management overhead incurred by the user or a third party, the clearing expenses for redeemed coupons and the user profiling costs for targeted coupon distribution. There are additional issues with both paper and electronic forms of coupons. The paper coupons require a user to cut the coupons, store them and carry them to a physical store for redemption, allow limited targeting and has larger distribution costs. On the other hand, various kinds of frauds are possible in an electronic coupon generation, presentation, redemption and clearing system. These include double spending of electronic coupon at same or different sites by the customer, tampering of electronic coupons to modify the validity period, discount amount or conditions, creation of a fake electronic coupons, trading of coupons between customers, duplication of electronic coupons by the retailer and claiming them from the manufacturer, retailer colluding with other retailers to exchange the list of redeemed coupons, tampering of electronic coupons by the retailer. These frauds often defeat the objective of targeting or limiting the number of coupons by the coupon issuer and also make it difficult for the coupon issuer to estimate coupon redemption rate or budget for a coupon campaign.

Haggling and price mark downs has been in practice since ages by physical stores. However, doing the same for online stores is not a trivial task. There are various online e-commerce sites such as "www.amazon.com", "www.ex-actis.com" and "www.fashionmall.com" that offer targeted discounts to their customers, some using complex mathematical tools to improve price markdown and inventory decisions. However, none of these sites provide a solution that can be used by a plurality of manufacturers to provide targeted markdowns or differential rewards to the users, through a plurality of online or physical retail stores.

Several centralized service provider based systems have also been proposed for giving merchandise discounts. U.S. Pat. No. 5,185,695 to Pruchnicki for "Method and System for Handling Discount Coupons by Using Centrally Stored Manufacturer Coupons in Place of Paper Coupons" describes a method and system for handling merchandise discounts by using centrally stored discount list in place of paper coupons, to save costs of printing and distributing and clearing paper coupons. The method and apparatus includes a central processor that receives information of product type, validation period and discount value from manufacturers and produces a central discount list of available discounts. The central list is transmitted to retailers. The retailers produce a local discount list based on the central list containing only those manufacturers and product type which the retailer holds for sale. The customer buys a product and as the product is moved through the checkout station, merchandise discount, if any applicable, is deducted from the retail price. The central processor directly bills the manufacturer or transfers funds. This solution does not provide any form of targeted discounts; they are just giving discounts to all customers purchasing the discounted products. The untargeted markdown or reward has a disadvantage of giving discounts even to the customers who would have otherwise purchased the product at its original retail price, thereby incurring loss equal to the discounted amount.

U.S. Pat. No. 5,924,080 to Johnson for "Computerized Discount Redemption System" describes a similar method of giving merchandise discounts by using a membership system comprising of a centralized system provider, multiple manufacturers, multiple merchants and multiple customers. Each customer gets a membership card having a unique customer identification (ID) that is also stored at provider's end. Manufacturers provide information on merchandise and discounts to the centralized system provider. Customers become aware of the discounts by some means such as media advertisement and buy the merchandise at a member merchant store. Merchant scans the merchandise ID and customer ID and sends these online to the centralized system provider system. The centralized system provider verifies the customer membership, the discounts on the items being purchased by the customer and sends the discount amounts to the merchant computer.

U.S. Pat. No. 5,857,175 to Day et al. for "System and Method for Offering Targeted Discounts to Customers" also describes a card based system for presenting customized special offers to customers wherein the special offers may be targeted. These systems offer target discounts to the customers wherein the customers do not have to present any coupons or file rebates. Also the merchants do not have to process any coupons or discounts and these systems support multiple manufacturers. However, they require the customer to become a member of the system and carry a machine readable membership card for identifying himself or herself, the retailers to have a card reader for reading machine readable customer card information, the manufacturers and their promotion agents to issue membership cards to their customers and provide only limited dynamic user profiling. Also in these systems the type of targeting that is possible is limited; e.g., if a manufacturer or service provider wishes to target the rewards based on the users' Internet service provider (ISP), it would require issuing membership cards to all the applicable users. Additionally, the distribution of physical cards may be cost intensive and require enormous amount of effort. Also, card based solutions can not be extended for online stores in a straight forward manner.

SUMMARY OF THE INVENTION

It is therefore an object of the present invention to provide an on-line methodology and system for giving differential rewards to users that supports multiple manufacturers and multiple reward distribution agents.

It is another object of the invention to provide an on-line system for giving differential rewards that supports diverse ways of targeting and profiling, including dynamic user profiling.

It is a further object of the invention to provide an on-line methodology and system for giving differential rewards wherein the users need not carry any coupon or card or even make any conscious effort for availing themselves of the intended offer or even be aware of the reward scheme; i.e., the reward may be a surprise gift.

According to the invention, there is provided a methodology and system is given here wherein a plurality of reward scheme owners can give differential rewards, through a plurality of reward distribution agents, to various users possibly based on the user profile. The reward scheme owner may be a seller, a manufacturer, a sales promotion agent or even an intermediary. Similarly, the reward distribution agent may be an on-line or a physical retailer, a broker, a seller or an intermediary. Also the users may be consumers, businesses, brokers or other intermediaries. In one specific case of this invention, a reward scheme owner defines a plurality of reward schemes, including at least one differential reward scheme giving different rewards to different users. The reward scheme owner communicates these to a central reward scheme database server. The reward scheme owners may or may not advertise these schemes. The user visits an online or a physical store. The store acting as a reward distribution agent dynamically profiles the user, queries the central reward scheme database server if the user profile meets the criterion for one or more rewards and offers the applicable rewards to the user. The store later receives reimbursement for the rewards offered to various users, from the reward scheme owners. This invention may be used for offering targeted or differential discounts on different products and services, offering different promotional schemes on different combination of products, giving loyalty points, electronically distributing prizes, free samples, product warranties, tie-in promotions, cross selling, up selling, premiums, memberships, card discounts, organizing contests, sweepstakes, games and offering other similar rewards.

Additionally, in the present invention, most often the profiling can be deferred till the user actually becomes eligible for the reward. In contrast, for coupon based promotions, the profiling has to be done before issuing the coupons to the users. Similarly, for membership card based solutions, some profiling must be done before issuing the card. If the user does not use the coupon or does not avail the discount offered based on the card, the profiling effort is wasted. Hence, this invention may save valuable profiling effort in a lot of cases.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a flow diagram showing the logic of the customer behavior monitor of FIG. 3.

DETAILED DESCRIPTION OF A PREFERRED EMBODIMENT OF THE INVENTION

Figure 1:
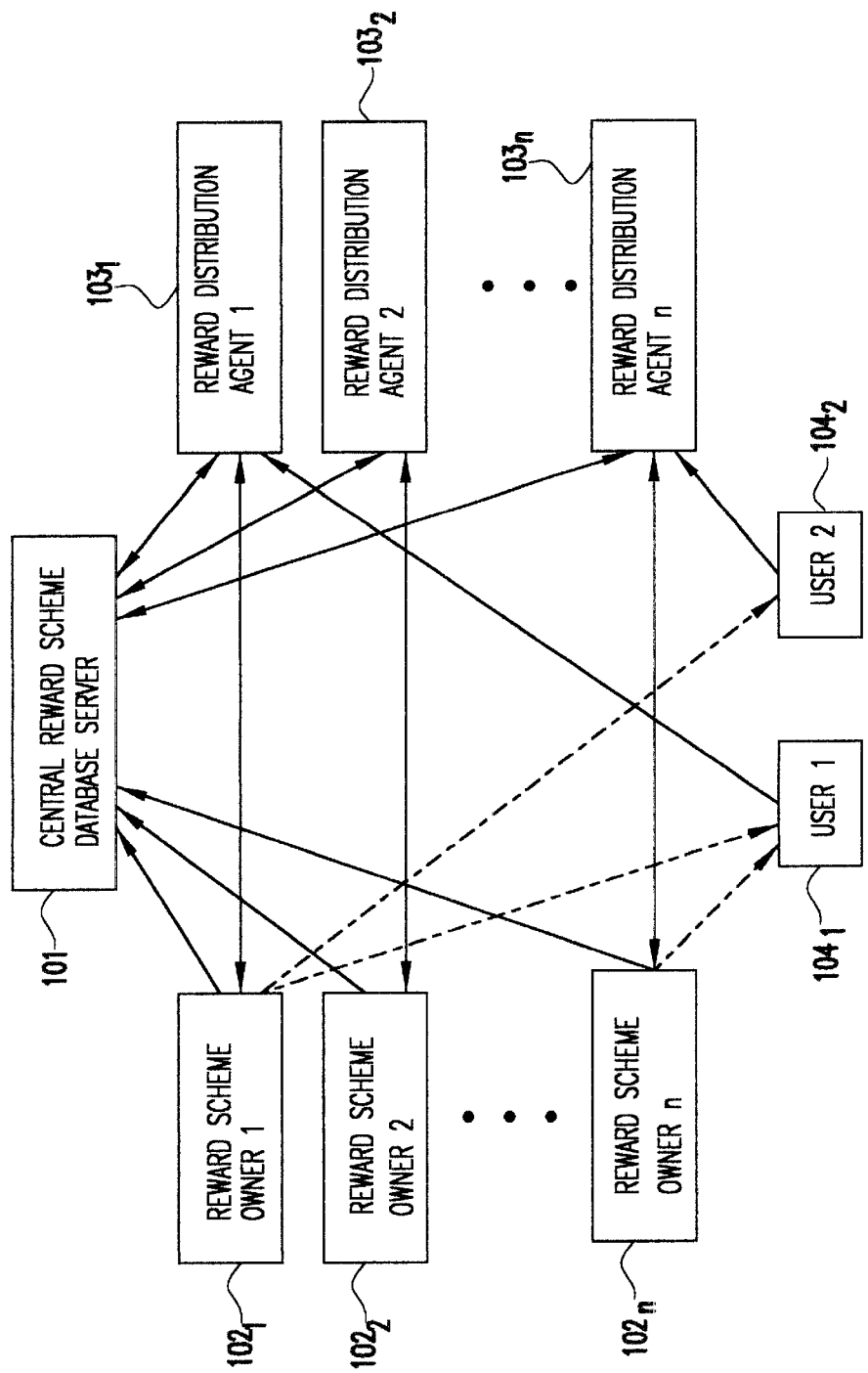
FIG. 1 is a block diagram showing the overall architecture of the differential awards system according to the invention.

Referring now to the drawings, and more particularly to FIG. 1, there is shown the overall architecture of the differential rewards system, comprising of a central reward scheme database server 101, a plurality of reward scheme owners $102_1$ to $102_n$, a plurality of reward distribution agents $103_1$ to $103_n$ and a plurality of users $104_1$ and $104_2$ and the interaction between them.

Figure 2:
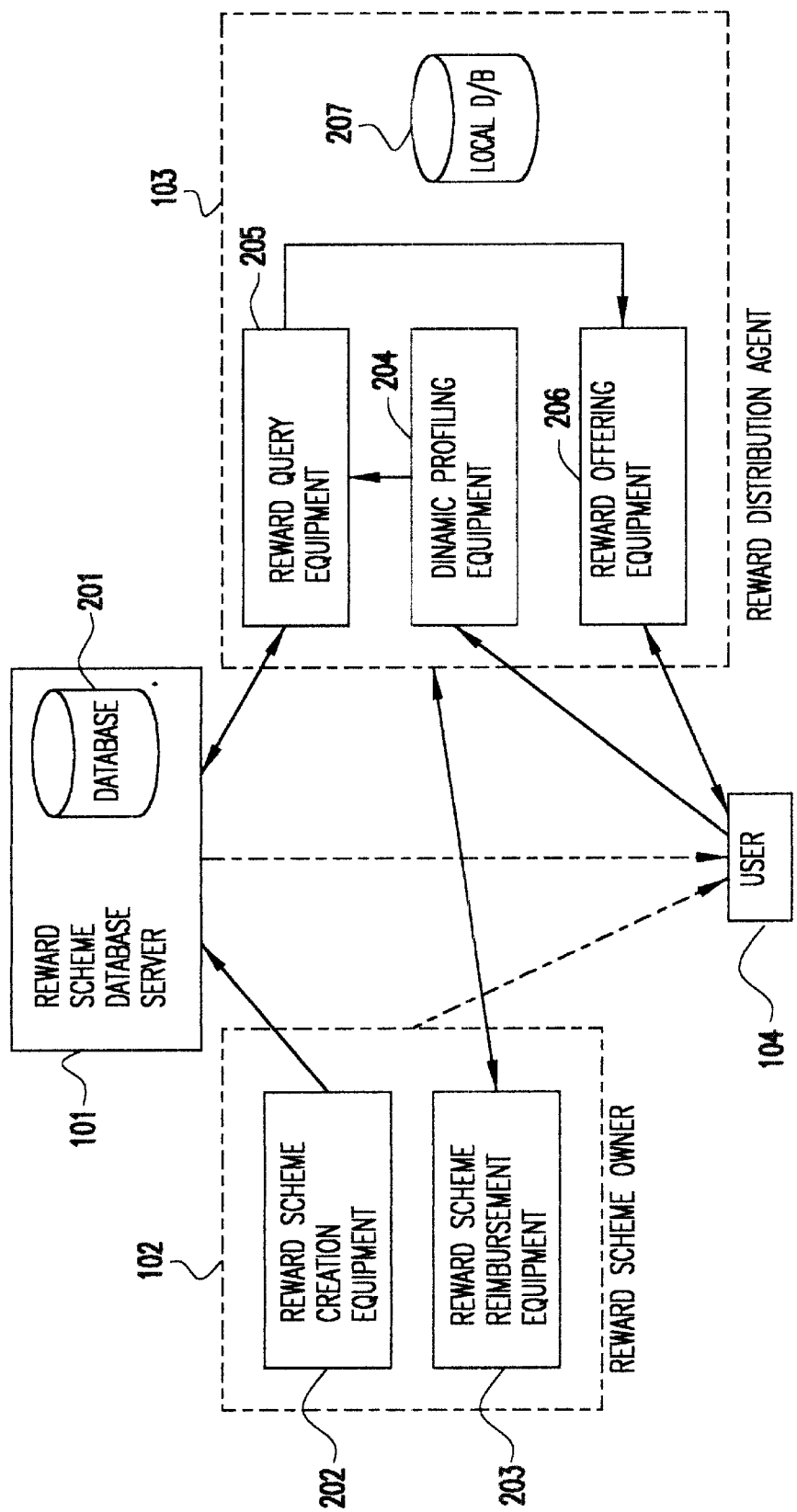
FIG. 2 is a block diagram showing the principle components of the differential awards system.

FIG. 2 shows the component diagram for the differential reward system comprising of a central reward scheme database server 101 including a database 201, a reward scheme owner 102, a user 104 and a reward distribution agent 103. The reward scheme owner 102, or his or her agent, usually owns or operates two components. These components are the reward scheme creation equipment 202 and the reward scheme reimbursement equipment 203. The reward distribution agent 103 usually owns or operates three components. These components are the dynamic profiling equipment 204, the reward query equipment 205 and the reward offering equipment 206. The dynamic profiling equipment 204 is the same as described in patent application Ser. No. 09/407,434. These components access a local database 207 maintained by the reward distribution agent.

Here we describe the architecture as shown in FIG. 1, the component diagram as shown in FIG. 2 and the event sequence for the differential rewards system according to this invention. The system consists of a plurality of reward schemes, a plurality of reward scheme creation equipment and reward scheme reimbursement equipment, the central reward scheme database server, a plurality of reward distribution agents, comprising of the dynamic profiling equipment, the reward query equipment and the reward offering equipment and the users of the system.

The objective of the system is to provide differential rewards to the users of the system. The reward scheme owner 102 decides when to start a reward scheme and what should be the definition of the scheme. He or she uses a reward scheme creation equipment 202 to define the reward scheme. The definition of the scheme may include the details of the reward and the criteria for offering the reward to a user. The reward specified is given only to the user or class of users satisfying the criteria for offering the reward to a user, thus being differential in nature. The details of the reward comprises of information describing the nature and quantitative measure of the reward being offered. Some examples of the rewards are discount on a product or service, loyalty points, freebies, product warranties, tie-in promotions, cross selling, up selling, premiums, etc. The criteria for offering the reward to a user comprises of user profiles. These profiles themselves are based on multi-valued attributes. Some of these attributes may be non-quantitative and fuzzy, e.g., festivals, seasons, user's cultural upbringing, etc., and some may be even nonuser specific, e.g., time of the day. In India for example, there is a concept of "boni" which is the money earned on the first transaction of every day. Merchants believe that once the "boni" occurs, the rest of the day will be fruitful. Thus the merchants usually accept lower prices in beginning of day to get the "boni" and the customers mind-set is also to pay a lower price. The profiles may include attributes based on:

The user's "click-through stream" (i.e., the movement of the user on the worldwide web or the Internet), user's voice and physical actions. For example, the user's voice can be captured by a voice recognition system and the physical actions by a digital camera that can transmit the data to an on-line site in real time. This helps in better targeting of the reward schemes since the facial and body expressions of the user may reveal some behavioral patterns that may help the manufacturer in formulating a better user profile.

The user's demographic, psyhcographic, technographic information and the user's past purchases. Technographic refers to the information such as the user's computer and network, kind of browser and operating system used by the user, his or her ISP, time of the day he or she visited and other related information that can be sent by the user's browser to an on-line site. In case the reward is targeted to a specific user, user may be identified by his or her name or credit card number or driver's license number or social security number or e-mail address or any other form of identification. In case the reward is targeted to a class of users, other identification like the postal code of residence, Internet service provider or brand of computer/software owned may be used.

The user's current purchase details, e.g., a reward scheme may require the user to purchase one, all or "m out of n" of the products and services specified. For instance, reward scheme such as "buy a shirt and get 50% off on a tie" or "buy two and get one free". Similarly, some offers may require the user to spend a minimum specified amount on specified products and services.

The validity periods. For example, a restaurant may give discounts only on Fridays. Similarly the rewards may be related to the weather or the season; e.g., rewards that are valid in pre-Christmas season.

Any other information that can be captured in an online or a physical store which may be used in describing terms and conditions of the reward. Some representative examples are:

Membership number: user presents a membership card or provides a membership number and receives some points towards the membership loyalty program.

Color of user's dress: user visits a store wearing say a red shirt or dress and is rewarded with a discount on his purchases. The color of user's dress, whether user visits a physical store or an on-line store, can be captured by a digital camera that can transmit the data to an on-line site in real time.

Any other attributes or information that can be derived by a combination of the attributes described above by media mining or online dynamic profiling. For example, the user's credit rating can be an attribute that can be derived by data mining from the user's past purchases, described as an attribute in second bullet above.

The sample terms and conditions described above are not exhaustive. A number of other terms and conditions may be devised e.g. the user wearing spectacles or the user smiling to avail the offer. A plurality of the above may be used for targeting a reward.

The reward scheme owner 102, or equivalently the creation equipment 202, communicates the reward schemes to a central reward scheme database server 101. Also, the owner 102 may inform the intended recipients (i.e., users) 104 of the reward, by targeted or untargeted messages and by using mass media or personalized communications.

The central reward scheme database server 101 receives reward schemes from various reward scheme owners and stores them in a central database 201. Also, it may publish partial or complete information about these reward schemes to the reward distribution agents 103. An agent may compile his or her own list of reward schemes by selectively storing the schemes of his or her interest, from the published information, in a local database 207. The central reward scheme database server 101 may also advertise the schemes through targeted or untargeted messages on behalf of the reward scheme owners 102.

The user 104 (who may or may not be aware of the reward schemes) performs some action(s) that may qualify him or her for one or more rewards, possibly at a reward distribution agent site. As the user navigates the site, the reward distribution agent 103 detects the actions and dynamically profiles the user. It also checks if the updated user profile qualifies to receive one or more rewards, either from his or her local database 207 or by querying the central reward scheme database server 101 in an on-line fashion. On receiving a positive response, The distribution agent 103 offers the applicable rewards to the user 104, who may choose to receive it or ignore it. The reward distribution agents periodically send the information to the reward scheme owners 102 for reimbursement.

The on-line methodology and system of giving differential rewards by an electronic system according to the invention thus comprises of a central reward scheme database server 101, multiple reward scheme owners 102, and multiple reward distribution agents 103 which serve multiple users. For our purpose, an equipment may be a specialized hardware or a software program running on a generic or specialized hardware. Also, the phrase "reward scheme" refers to "differential reward scheme" in this invention, unless otherwise specified.

The central reward scheme database server 101, usually owned or operated by a third party service provider, receives the reward schemes from various reward scheme owners 102 and stores them in database 201. It may store the different reward schemes as a map of the reward details, the rewarding criteria and the reward scheme owner. It provides an interface for a reward query equipment 205 to send a profile and query if the profile meets the criterion for one or more rewards. It also provides an interface for a reward query equipment 205 to request for the complete or partial list of reward schemes. The response may be limited to the types of scheme that the reward query equipment 205 might be interested in or limited to the new schemes that have been added to the central server database 201 since the agent's last query. The central reward scheme database server 101 may also publish the list of various reward schemes with partial or complete information for the benefit of reward distribution agents 103.

The plurality of reward distribution agents 103 each comprise the dynamic profiling equipment 204, the reward query equipment 205 and the reward offering equipment 206. A reward distribution agent is capable of detecting the events that qualify a user for one or more rewards and is responsible for actually offering the reward to a qualifying user. The reward distribution agent can be an online e-commerce site or it can be a physical store.

The online dynamic profiling equipment 204 uses the past history that the reward distribution agent has about various other users, to determine various user profiles. When a new user comes to the reward distribution agent's on-line site, the site decides which profile the user belongs to. The initial assignment to a profile is based on whatever information is available about the user at the time of assignment. As the user navigates the site, the dynamic profiling equipment 204 captures the user's "click-through stream", voice and physical actions and dynamically updates the user's profile. Thus, it dynamically monitors and updates the user's profile and also notifies the reward query equipment of the changes in the user's profile.

The reward query equipment 205 on receiving a notification about the change in customer's profile, checks to see if the customer's updated profile meets the criterion for one or more rewards and gets the details of the applicable rewards. It can do so either by sending on-line the new profile to the central reward scheme database server 101 through a communication network or querying its local copy of the reward schemes obtained from the central reward scheme database server. In case it decides to maintain a local copy of the reward schemes, it makes sure to update the local copy periodically from the central reward scheme database server to become aware of the new reward schemes that get added.

The reward offering equipment 206 offers the reward to the concerned user as per the reward details obtained from the reward query equipment. It optionally logs the user profile, the reward offered and the date and time of the transaction. The reward distribution agent can use the logs as the proof of valid user transaction, if required, at the time of requesting reimbursement from the reward scheme owners.

A plurality of reward scheme reimbursement equipments 203 are usually owned or operated by the reward scheme owner 102. It allows the reward distribution agents to claim reimbursement for the rewards offered by them to various customers. This could be operated in an on-line or an off-line manner.

In one embodiment of the present invention, a user navigates the world wide web (WWW) using an electronic device, such as a personal computer (PC) or a cellular phone or a personal digital assistant (PDA) or a TV, which has a display device and an input device, and optionally storage and printing devices. When a new user visits a reward distribution agent's site, possibly unaware of any reward schemes, the online dynamic profiling equipment assigns a profile to the user, based on whatever information is available about the user at the time of assignment. As the user navigates the site, the on-line dynamic profiling equipment 204 captures the user's "click-through stream", voice and physical actions and dynamically updates the user profile. It also notifies the reward query equipment 205 of the changes in the user's profile. The reward query equipment on receiving a notification about the change in user's profile, checks if the user's current profile meets the criterion for one or more rewards and gets the details of the applicable rewards. The reward offering equipment presents the reward to the user, which is displayed on his or her screen. At a later stage, the reward distribution agents 103 claim reimbursement from the appropriate reward scheme reimbursement equipment 203.

In another embodiment of the present invention, the reward scheme owners 102 notify the targeted users 104 of the reward schemes, either through personalized e-mail or surface mail. The extent of scheme details can vary from complete information on the reward details and the rewarding criteria revealed to say a range of the discount amount. For example, a targeted user receives a mail informing that the user will get a discount between 30% and 70% on purchasing a particular brand of shirt form any online store. In another embodiment of the present invention, the reward scheme owners 102 communicate the reward schemes by mass-media advertisement or mails, with limited targeting. Again, the extent of reward scheme details revealed can vary from complete information on the reward details and the rewarding random discount is being offered on purchasing a particular brand of shirt form any online store.

In another embodiment of the present invention, the reward scheme consists of a plurality of records. Each record comprises of the reward details and the rewarding criteria. For example, the reward value can be $10 for users with a credit rating 1 (credit rating being the rewarding criterion) and $20 for users with a credit rating 5. The credit rating could be captured as part of the user profile. In another embodiment of the present invention, the reward scheme consists of some function of the reward details and the rewarding criteria. For example, the reward value may be an increasing function of the rewarding criteria which could be the number of times a user visits a product page.

In another embodiment of the present invention, the reward scheme reimbursement equipment 203 may be operated by a third party service provider to provide reimbursement services to multiple reward distribution agents 103 on behalf of multiple reward scheme owners 102.

In another embodiment of the present invention, the reward scheme owners 102 communicate a plurality of reward schemes to a plurality of central reward scheme database servers 101. Each reward scheme database server 101 then publishes its contact address along with the reward schemes that it has received from various reward scheme owners. The reward distribution agent 103 then queries those central reward scheme database servers that publish the reward schemes of the former's interest.

In another embodiment of the present invention, the reward query equipment 205 keeps only the list of profiles and not complete reward schemes, in the local database. The reward query equipment 205 then checks the local database whether a new profile meets the criterion for any reward scheme. If the customer's profile matches the criteria for at least one reward scheme, the reward query equipment gets the details of the reward from the central reward scheme database server. The reward query equipment may also limit the local database to the list of profiles, for the reward schemes that the reward distribution agent is interested in.

In another embodiment, the present invention can be used for providing targeted markdown. Markdown is reduction in the retail price of an item for the purpose of stimulating traffic and inventory management say for overstocked or out-of-fashion items. Markdown, if done in a targeted manner. can fetch better revenues by offering price reduction based on the user profile. Here the reward scheme comprises of the product being discounted, the discount amount, the targeted user profiles and various other conditions like the validity period of the offer, prerequisite purchases etc. The scheme is applicable to the products and services from a plurality of manufacturers offered at a plurality of retailer stores. The reward scheme owners are the manufacturers of discounted products, the provider of discounted services or their sales promotion agents. They communicate the reward schemes to the central reward scheme database server which stores the schemes and optionally publishes them for the retailers. The targeted users may or may not be informed of the reward scheme. The information conveyed to the users may be partial or complete. When the user visits a reward distribution agent's site, say a participating retailer's store, and performs some actions; e.g., purchasing a product, the retailer dynamically computes user profile. The retailer queries the central database server for the applicable reward details and provides appropriate discount to the user on the purchased product. Later the manufacturers, directly or though a third party service, reimburse the retailers.

In another embodiment, the present invention can be used for an on-line gambling (or lottery) system. Here the reward scheme comprises of a plurality of records. Each record is a pair of the gambling game's outcome and the award for the outcome. For example in case of lottery, the pairs are the winning lottery ticket numbers and their respective prizes. The reward scheme may also include the charge for playing a gambling game. For the lottery example, the charge for playing a game is equivalent to the price of a lottery ticket. The reward scheme owners are the lottery promoters who send the information on rules of the game and the reward schemes to the central database server. They may advertise about the lottery or gambling scheme through mass media or personalized mail. When a user visits an on-line gambling site which is the reward distribution agent in this case, user may choose to play one or more rounds of the gambling game or purchase lottery tickets. The reward distribution agent obtains the results of each game from the central database server or from its local copy of the central database and gives the appropriate award to the user. Later the reward scheme owners, directly or though a third party service, reimburse the reward distribution agents.

In another embodiment of this invention, the reward scheme also contains an incentive scheme for the reward distribution agent and a specification of an event. The amount of incentive depends upon the reward given to the user. The incentive scheme could represent the commission to be given to a reward distribution agent. When a reward is presented to the user and the specified event occurs (such as sale of a product), the reward distribution agent is entitled to an incentive in accordance with the incentive scheme.

In other embodiments of this invention, the incentive scheme could be a profit sharing, or revenue sharing scheme between the reward scheme owner and reward distribution agent, or any other scheme where the incentive given to the reward distribution agent depends on the reward given to the user.

In another embodiment of this invention, the reward scheme owner gives certain flexibility to the reward distribution agent in determining the amount of reward to be given to a user of certain profiles. In this case the reward scheme contains a range of incentives which may be offered to a user of a given profile. The reward distribution agent determines the exact reward in accordance with its local policies (for example: a policy maximizing the incentive given to him or her).

In another embodiment of the present invention, the reward distribution agent 103 may be a physical store rather than an on-line site. When the user 104 visits a physical store, the dynamic profiling equipment 204 captures the nonuser specific attributes such as time of the day, the user's present purchases, voice and physical actions and updates the user profile. The reward query equipment determines the applicable rewards, and the reward offering equipment 206 offers the rewards.

In various embodiments of this invention, some or all of the information exchanged between the entities described above, may be encrypted.

In another embodiment, the reward scheme creation equipment 202 and the reward scheme reimbursement equipment 203 are operated by the reward scheme owner 102, but in another embodiment, the reward scheme creation equipment 202, the central reward scheme database server 101 and the reward scheme reimbursement equipment 203 are operated by the same service provider. In other embodiments of this invention, any combination of equipment mentioned above may be operated by different service providers.

In other embodiments, present invention may be used for offering targeted or untargeted discounts on different products and services, offering different reward schemes on different combination of products, giving loyalty points, electronically distributing prizes, free samples, product warranties, tie-in promotions, cross selling, up selling, premiums, memberships, card discounts and organizing contest, sweepstakes, games etc.

Figure 3:
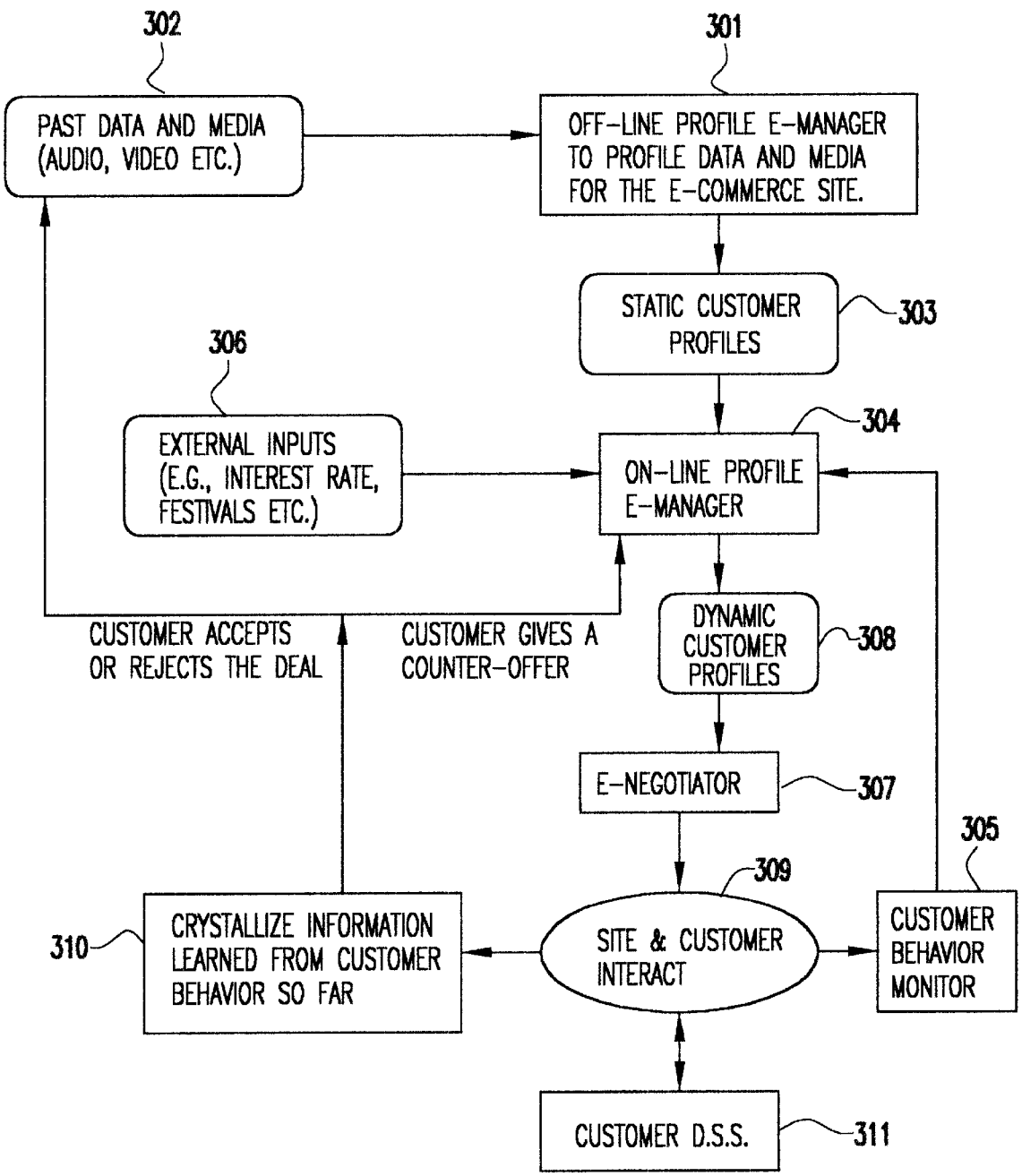
FIG. 3 is a data flow diagram showing the process of on-line negotiations.
Figure 4:
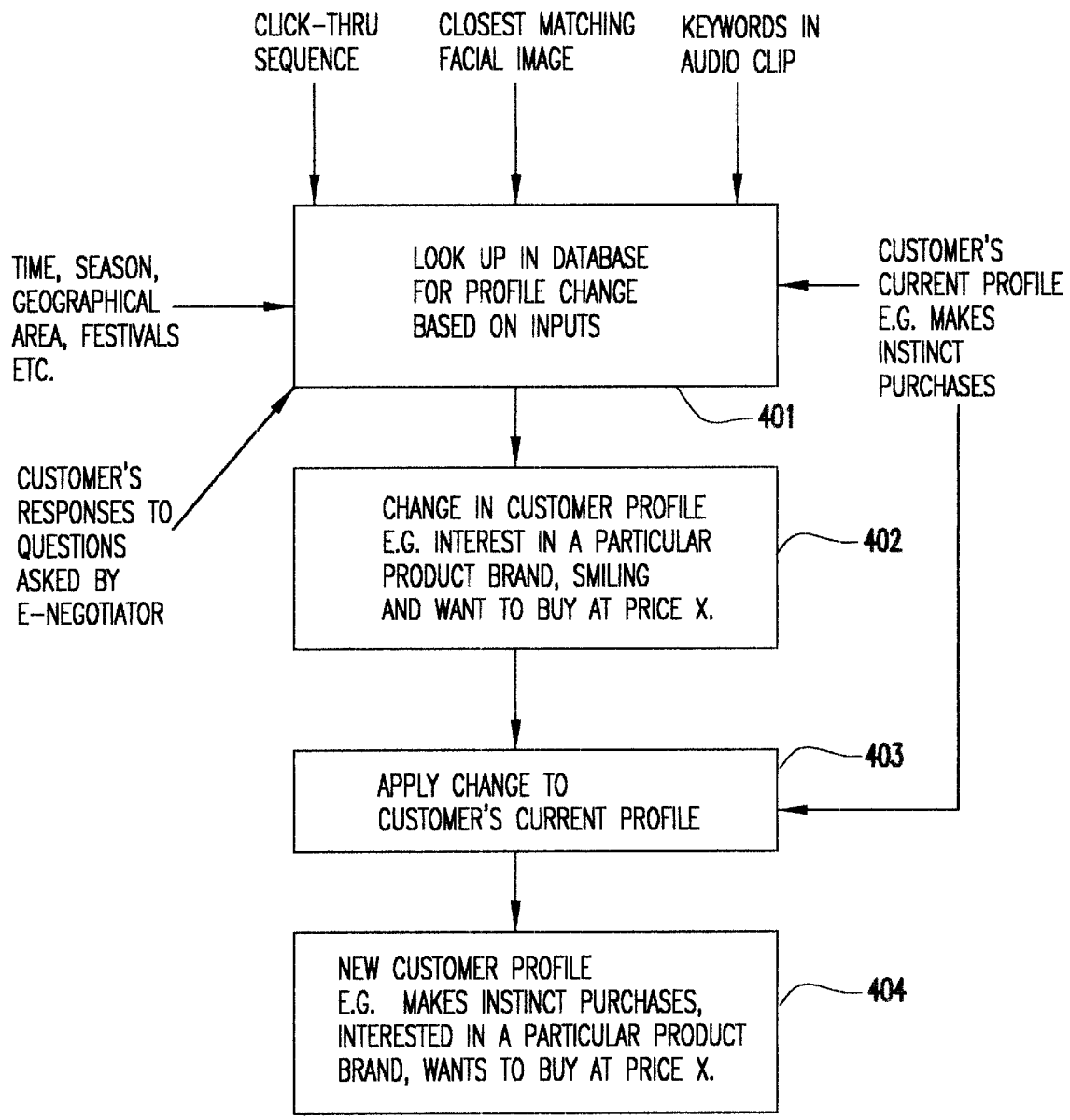
FIG. 4 is a flow diagram showing the logic of the on-line profile e-manager of FIG. 3.

FIGS. 3, 4 and 5 are taken from application Ser. No. 09/407,434. They show the apparatus for online negotiations with dynamic profiling. This is an example of the apparatus that can be used for dynamic profiling equipment 204 in our invention. For our purpose, the e-negotiator component 307 is replaced by the reward query equipment 205 and the reward offering equipment 206. Also, the Customer Decision Support System (DSS) 311 may not be present in our customization.

Referring now specifically to FIG. 3, there is shown the e-commerce site's decision support system (DSS) for on-line negotiations. It will be understood from the following description that the customer may have a similar decision support system. The Off-line Profile e-manager 301 analyses the available Past Data and Media 302 of the customer's previous purchases from various off-line or on-line stores, including itself. The Off-line Profile e-manager 301 can use various data-mining and media-mining techniques on the past records to compute and update the Static Customer Profiles 303. When a customer visits the e-commerce site, the On-line Profile e-manager 304, described in more detail with reference to FIG. 4, assigns an initial profile to the customer. If the customer is visiting the site for the first time, initial profile assignment is done based on the information available about the Customer, at the time of assignment, and the Static Customer Profiles 303. If the customer has visited the site earlier, the last visit's customer profile is used. Customer Behavior Monitor 305 starts monitoring the customer's click-through, speech, facial and body expressions, and continues to do so until the customer exits the site. Customer Behavior Monitor 305, described in more detail with reference to FIG. 5, tries to capture the customer's demographic, behavioral as well as technographic information and relays the data to the On-line Profile e-manager 304. (Technographic refers to the information such as the customer's computer and network, kind of browser and operating system used by the customer, his or her Internet service provider (ISP), time of the day he or she visited, that the customer's browser can send to the e-site.) The On-line Profile e-manager 304 uses external inputs 306, like the seasonal variations, festivals and cultural upbringing factors, Static Customer Profiles 303, inputs from Customer Behavior Monitor 305 and the feedback from the e-negotiator 307 to compute and update the Dynamic Customer Profiles 308. An e-negotiator may be a human who is negotiating on behalf of the e-commerce site or may be a computer program or device (i.e., hardware or software) sitting on the other side. The Dynamic Customer Profiles 308 are the profiles currently assigned to the various customers and are updated dynamically to reflect the customer's behavior and other environmental factors. The e-negotiator 307 negotiates with the customer based on the customer's dynamic profile. The site and customer interact at 308 providing input to the customer behavior monitor 305 which is fed back to the On-line Profile e-manager 304. The e-negotiator 307 could offer an incentive, ask for the customer's quote or cross-sell some product based on the customer's dynamic profile. Information learned from the customer is crystalized at 310 and fed back to the past data and media database 302 and to the On-line Profile e-manager 304. For example, if the customer proposes a counter offer, the information is sent to the On-line Profile e-manager 304, so that this can be incorporated in the customer's dynamic profile. The e-negotiator 307 then uses the updated customer profile to further negotiate with the customer. If the customer accepts or rejects the deal, the information is sent to the Past Data and Media 302 for further analysis. The Customer Decision Support System (DSS) 311 provides support for the site and customer interaction 309 may be a human or a computer program or device. The Customer Decision Support System (DSS) 311 is the mirror image of the e-commerce site Decision Support System (DSS) just described. Please note that all or some of this computation and negotiation can be done by a computer program or a device with the remaining portion being done by the humans.

The On-line Profile e-manager 304 shown in FIG. 3 is shown in more detail in FIG. 4. The input component is a search engine 401 which looks in a database for profile change based on inputs. These inputs include (1) the customer's responses to questions asked by the e-negotiator, (2) time, season, geographical area, festivals, etc., (3) click-through sequence of the customer, (4) a closest matching facial image, (5) keywords in an audio clip, and (6) the customer's current profile. The profile change is then used at 402 to change the customer profile as, for example, the customer shows an interest in a particular product brand, smiling and wants to pay a certain price. This change is applied to the customer's current profile at 403 to generate a new customer profile at 404.

FIG. 5 shows in more detail the customer behavior monitor 505 in FIG. 3. It is assumed that there is a video conferencing mechanism in place between the e-commerce site and the customer. By that, what is meant is a human computer interface which captures the customer's (conversely, the seller's) actions, such as speech, facial and body expressions. This interface typically is constituted by a video (i.e., television) monitor and a telephone or other communication device including a cellular telephone that can transmit signals in a wired or wireless fashion to the e-commerce site's (conversely, the customer's) behavior monitor.

As shown in FIG. 5, the behavior monitor receives several inputs, represented here by the customer's click, the customer's facial expression and the customer's speech. The customer's click is input to module 501 which updates the customer's click-through so far and outputs the customer's click-through sequence. The customer's facial expression is input to module 502 which is typically a video recording instrument that provides as an output a facial image 503. This image output is searched in a database of facial images at 504. Comparator 505 compares the customer's facial image with those of the database to determine, for example, if the customer is frowning, smiling, annoyed, etc., and than outputs the closest matching facial image. The customer's speech is input to module 506 which is typically an audio recorder that provides an audio clip output 507. A parser 508 parses the audio clip and looks for key words.

Use Case Scenarios

We further describe two use case scenarios of the system, one for the purpose of providing targeted discounts to the users of the system and the other for on-line gambling or lottery. However, these are only demonstrative cases and the use of system is not limited to these cases only.

Targeted Discounts

In the use case where the differential rewards system is used to provide targeted discounts, the reward scheme is "targeted discount on products or services". The reward scheme is offered and defined by the manufacturer of the product or the provider of the service. The reward scheme definition may include the description of product (or service) on discount, the user profiles that are eligible for discount, the discount amounts, in absolute amount or percentage, for various users or user profiles, the validity period and any other terms and conditions. The manufacturer communicates the reward scheme to the central reward scheme database server and may also advertise to the intended customers in a targeted or untargeted fashion. The advertisement may have complete information or partial information. It is important to note that for targeted discounts, the customer need not "carry" anything, nor is he/she required to remember anything, which is a big problem for any coupon or card based discount offers.

The central reward scheme database server 101 receives the reward scheme and stores it in database 201. It may publish the complete or partial information about the scheme for the benefit of the reward distribution agents 103. The reward distribution agents may prepare their own list of schemes by selectively saving the schemes of their interest in their respective local databases 207.

A customer (i.e., user) 104 goes to a reward distribution agent 103 (who may be an on-line or a physical retailer) and performs an action that qualifies him or her for the discount (e.g., he or she purchases the item on discount). The reward distribution agent 103 detects the event. The agent then either checks in its local database 207 and/or queries the central reward scheme database server 101 for the details of the discount for this customer. When it receives a positive response, it offers the discount to the customer. The customer may choose to accept it or may ignore the offer. The retailers send all the transaction details to the manufacturer later for reimbursement.

Online Gambling/lottery

The use of our system for gambling is quite simple. Here, the reward scheme is the "online lottery" and the reward scheme owner is the promoter of the lottery. The promoter of the lottery defines the prizes for the tickets, that are based on ticket numbers, and communicates this information to the central reward scheme database server. The central reward scheme database server stores the lottery scheme in the database. The promoter of the lottery or the central database server may advertise about the lottery scheme.

When a user 104 wants to take part in the online lottery scheme, he or she may go to an agent site for this scheme. He or she orders a lottery ticket. The agent 103 contacts the central reward scheme database server 101 and gets a ticket for the user. The server 101 also informs the agent 103 about the prize on the ticket. The result of the lottery is shown to the user immediately. If the user gets some prize, the agent offer the prize to the user. The transaction is recorded in the local database 207 of the agent. The record is used for the clearance purpose later on. The promoter (i.e., the reward scheme owner) 102 of the lottery reimburses the agent 103 for the prizes given by them.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. An on-line system of giving differential rewards to users by an electronic system comprising:

a central reward scheme database server, including a database for storing reward schemes, wherein a reward scheme consists of the details of the reward and criteria for offering the reward to a user, the reward specified being given only to a user or class of users satisfying the criteria for offering the reward to a user, thereby being differential in nature, wherein the details of the reward comprise information describing the nature and quantitative measure of the reward being offered, and the criteria for offering the reward to a user comprise user profiles which are based on multi-valued attributes, wherein the attributes include non-quantitative and fuzzy user attributes, nonuser specific attributes, and the user's voice and physical actions, and wherein the rewards include discount on a product or service, loyalty points, freebies, product warranties, tie-in promotions, cross selling, up selling, and premiums;

multiple reward scheme owners, each of said reward scheme owners defining a plurality of reward schemes, including at least one differential reward scheme giving different rewards to different users, the reward schemes being communicated to the central reward scheme database server by the reward scheme owners;

a plurality of reward scheme creation equipment used to define a plurality of reward schemes, including at least one differential offer which is to be made to the user satisfying an offer's targeting parameters; and multiple reward distribution agents each of which, when visited by a user, dynamically profiles the user, queries the central reward scheme database server to determine if the user meets a criterion for one or more rewards and offers the applicable rewards to the user.

2. An on-line method of giving differential rewards to users by an electronic system comprising the steps of:

storing reward schemes in a central reward scheme database server wherein a reward scheme consists of the details of the reward and criteria for offering the reward to a user, the reward specified being given only to a user or class of users satisfying the criteria for offering the reward to a user, thereby being differential in nature, wherein the details of the reward comprise information describing the nature and quantitative measure of the reward being offered, and the criteria for offering the reward to a user comprise user profiles which are based on multi-valued attributes, wherein the attributes include non-quantitative and fuzzy user attributes, nonuser specific attributes, and the user's voice and physical actions, and wherein the rewards include discount on a product or service, loyalty points, freebies, product warranties, tie-in promotions, cross selling, up selling, and premiums;

defining by multiple reward scheme owners a plurality of reward schemes, including at least one differential reward scheme giving different rewards to different users, the reward schemes being communicated to the central reward scheme database server by the reward scheme owners;

providing a plurality of reward scheme creation equipment used to define a plurality of reward schemes, including at least one differential offer which is to be made to the user satisfying an offer's targeting parameters; and dynamically profiling a user by a reward distribution agent, when visited by the user, and querying the central reward scheme database server to determine if the user meets a criterion for one or more rewards and offering the applicable rewards to the user.

3. The on-line system of claim 1 wherein the user's physical actions include facial and body expressions of the user.

4. The method of claim 2 wherein the user's physical actions include facial and body expressions of the user.

5. An on-line system of giving differential rewards to users by an electronic system comprising:

a central reward scheme database server, including a database for storing reward schemes, wherein a reward scheme consists of the details of the reward and criteria for offering the reward to a user, the reward specified being given only to a user or class of users satisfying the criteria for offering the reward to a user, thereby being differential in nature, wherein the details of the reward comprise information describing the nature and quantitative measure of the reward being offered, and the criteria for offering the reward to a user comprise user profiles which are based on multi-valued attributes, wherein the attributes are derived from a combination of attributes generated by data mining and on-line dynamic profiling of the user and include non-quantitative and fuzzy user attributes and nonuser specific attributes and wherein the user's credit rating is an attribute derived from data mining of the user's past purchases, and wherein the rewards include discount on a product or service, loyalty points, freebies, product warranties, tie-in promotions, cross selling, up selling, and premiums;

multiple reward scheme owners, each of said reward scheme owners defining a plurality of reward schemes, including at least one differential reward scheme giving different rewards to different users, the reward schemes being communicated to the central reward scheme database server by the reward scheme owners;

a plurality of reward scheme creation equipment used to define a plurality of reward schemes, including at least one differential offer which is to be made to the user satisfying an offer's targeting parameters; and multiple reward distribution agents each of which, when visited by a user, dynamically profiles the user, queries the central reward scheme database server to determine if the user meets a criterion for one or more rewards and offers the applicable rewards to the user.

6. An on-line method of giving differential rewards to users by an electronic system comprising the steps of:

storing reward schemes in a central reward scheme database server wherein a reward scheme consists of the details of the reward and criteria for offering the reward to a user, the reward specified being given only to a user or class of users satisfying the criteria for offering the reward to a user, thereby being differential in nature, wherein the details of the reward comprise information describing the nature and quantitative measure of the reward being offered, and the criteria for offering the reward to a user comprise user profiles which are based on multi-valued attributes, wherein the attributes are derived from a combination of attributes generated by data mining and on-line dynamic profiling of the user and include non-quantitative and fuzzy user attributes and nonuser specific attributes and wherein the user's credit rating is an attribute derived from data mining the user's past purchases, and wherein the rewards include discount on a product or service, loyalty points, freebies, product warranties, tie-in promotions, cross selling, up selling, and premiums;

defining by multiple reward scheme owners a plurality of reward schemes, including at least one differential reward scheme giving different rewards to different users, the reward schemes being communicated to the central reward scheme database server by the reward scheme owners;

providing a plurality of reward scheme creation equipment used to define a plurality of reward schemes, including at least one differential offer which is to be made to the user satisfying an offer's targeting parameters; and dynamically profiling a user by a reward distribution agent, when visited by the user, and querying the central reward scheme database server to determine if the user meets a criterion for one or more rewards and offering the applicable rewards to the user.

* * * * *